UNITED STATES PATENT OFFICE 2,679,465

METHOD FOR REMOVING POLYMERS OF FURFURAL FROM METALLIC SURFACES

Dwight L. McKay, Bartlesville, Okla., assignor to Phillips Petroleum Company, a corporation of Delaware No Drawing. Application August 21, 1950,
Serial No. 180,709

7 Claims. (Cl. 134—40)

This invention relates to the dissolution of polymers which result from furfural. In one of its aspects this invention relates to a method for dissolving furfural polymers formed during the use of furfural as a selective or other solvent. In a more specific aspect the invention provides a novel solvent for the dissolution of said furfural polymer. In one of its embodiments this invention comprises a step for the removal of furfural polymers which are deposited in heat exchangers and on other surfaces used in connection with certain selective solvent processes particularly wherein hydrocarbons are selectively extracted.

The use of furfural as a selective solvent in the separation of hydrocarbons results in a deposition of furfural polymer on the metal surfaces of the equipment employed and especially on the heat transfer surfaces of the distillation equipment, wherein the furfural is separated from the recovered hydrocarbon. Heretofore this polymer has been removed by burning in the case of removable parts, such as the tube bundle in the furfural distillation column and by sand blasting those surfaces which are not removable. These methods are obviously expensive and time consuming and therefore are not resorted to until the efficiency of the process has been reduced to the absolute minimum as a result of these fouled surfaces. Replacement costs of equipment are abnormally high as a result of these drastic methods of cleaning the fouled metal surfaces.

I have found that monoethanolamine, diethanolamine and triethanolamine will satisfactorily dissolve and remove furfural polymers, especially those which are formed when furfural is subjected to elevated temperatures for extended periods of time. I have also found that most of the alcohol amine can be recovered by distillation without depositing the furfural polymer on the heat transfer surfaces of the recovery unit.

The table below shows the results of some tests conducted according to the invention.

TABLE

Solubility of Furfural Polymer in Various Solvents

| Solvent | Temp., °F. | Polymer Solubility, grams/100 grams solvent |
|---|---|---|
| Monoethanolamine | 99 | 4. |
| Do | 250 | > 15.1.[a] |
| Do | [b] 310 | > 23.5.[a] |
| Monoethanolamine and water [c] | [b] 222 | Negligible. |
| Monoethanolamine and acetone [c] | [b] 177 | 10.9. |
| Acetone | [b] 133 | 4.6. |
| Morpholine | 210 | 9.9. |
| Pyridine | [b] 240 | 3.0. |

[a] All polymer charged to flask was dissolved.
[b] Boiling point.
[c] Equal parts by weight.

The above tests were made by heating polymer and solvent at a constant temperature in a small flask for a period of approximately four hours. In some cases the solvent was refluxed at its boiling point with a total condenser attached to the flask. At the end of each heating period, the hot solution was filtered and the undissolved polymer weighed.

It was noted that upon cooling nearly all the dissolved polymer precipitated which facilitates solvent recovery.

It is noted that the ethanolamine which was employed in the experiments summarized in the above table gave especially good results at elevated temperatures. Therefore, according to this invention it is preferred to preheat the ethanolamine prior to its application to the polymer to be dissolved and removed. Or, the ethanolamine may be applied to the surface, from which the polymer is to be removed, for an extended period of time, or after application the surface itself can be heated. Indeed, the ethanolamine can be applied to the surface after the surface and polymer thereon have been preheated. When this is done there is less time required for dissolution of the polymer. However, ethanolamines whether heated or not can be employed.

As stated, it is preferred to apply the solvent of the invention in preheated condition and when so applied it will be at a temperature in the approximate range 95° to 340° F., preferably 200° to 270° F., still more preferably 225° to 265° F.

The upper temperature limit will depend upon the decomposition temperature of the ethanolamine which in turn will vary with pressure, amount of dissolved polymer and other factors.

The solvent of the invention is readily substantially recovered by cooling to precipitate the polymer or by distillation from the dissolved polymer contained therein.

Reasonable variation and modification are possible within the scope of the foregoing disclosure and the appended claims to the invention the essence of which is that it has been found that an alcohol amine, as described, preferably preheated, is a good solvent for furfural polymer and therefore can be employed to remove said polymer from surfaces, e. g. in recovery units which have become fouled therewith and that said solvent can be readily and substantially recovered from the said dissolved polymer.

I claim:

1. A method for removing polymers of furfural from metallic surfaces which comprises contacting said polymers with an alcohol amine selected from the group consisting of monoethanolamine, diethanolamine and triethanolamine at a temperature in the range of 200° to 340° F. for a period of time of at least 4 hours.

2. A method for dissolving polymers of furfural which comprises contacting said polymers with an ethanolamine at a temperature in the range 200° to 340° F. for a period of time sufficient to dissolve said polymer.

3. A method for dissolving polymers of furfural which comprises contacting said polymers with an ethanolamine at a temperature in the range 250° to 310° F. for a period of about 4 hours.

4. The method of claim 1 wherein the alcohol amine is monoethanolamine and the temperature is in the range 225° to 265° F.

5. The method of claim 1 wherein the alcohol amine is diethanolamine and the temperature is in the range 225° to 265° F.

6. The method of claim 1 wherein the alcohol amine is triethanolamine and the temperature is in the range 225° to 265° F.

7. A method for removing polymers of furfural from metallic surfaces which comprises contacting the said polymers with an alcohol amine selected from the group consisting of monoethanolamine, diethanolamine, and triethanolamine at a temperature above 95° F. and below the decomposition temperature of the alcohol amine for a period of time sufficient to dissolve said polymer.

References Cited in the file of this patent

UNITED STATES PATENTS

| Number | Name | Date |
|---|---|---|
| 2,460,600 | Sarbach | Feb. 1, 1949 |